(12) United States Patent
Hancock et al.

(10) Patent No.: US 10,393,091 B2
(45) Date of Patent: Aug. 27, 2019

(54) APPARATUS FOR MANIPULATING A WIND TURBINE BLADE AND METHOD OF BLADE HANDLING

(75) Inventors: Mark Hancock, Southampton Hampshire (GB); Anton Bech, Ringkobing (DK); Peter Frans Thomsen, Ringkobing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 635 days.

(21) Appl. No.: 14/122,597

(22) PCT Filed: May 25, 2012

(86) PCT No.: PCT/DK2012/050182
§ 371 (c)(1),
(2), (4) Date: Mar. 17, 2014

(87) PCT Pub. No.: WO2012/163358
PCT Pub. Date: Dec. 6, 2012

(65) Prior Publication Data
US 2014/0193255 A1 Jul. 10, 2014

Related U.S. Application Data

(60) Provisional application No. 61/491,286, filed on May 30, 2011.

(30) Foreign Application Priority Data

May 27, 2011 (DK) ................................. 2011 70264

(51) Int. Cl.
*F03D 7/02* (2006.01)
*F03D 13/10* (2016.01)
*F03D 13/40* (2016.01)

(52) U.S. Cl.
CPC ............. *F03D 7/022* (2013.01); *F03D 13/10* (2016.05); *F03D 13/40* (2016.05);
(Continued)

(58) Field of Classification Search
CPC .......... F03D 1/001; F03D 1/003; F03D 1/005; F03D 1/006; F03D 7/022; F05B 2230/61; Y02P 70/523; Y02E 10/72; Y02E 10/721
See application file for complete search history.

(56) References Cited

U.S. PATENT DOCUMENTS 4,264,278 A * 4/1981 Weingart ................ B29C 53/66
156/189
2005/0031431 A1* 2/2005 Wobben ................... B60P 3/40
410/45

(Continued)

FOREIGN PATENT DOCUMENTS

EP 1925582 A1 5/2008
EP 2075467 A2 7/2009

(Continued)

OTHER PUBLICATIONS

European Patent Office, International Search Report issued in International application No. PCT/DK2012/050182 dated Aug. 8, 2012.

(Continued)

*Primary Examiner* — Christopher M Koehler
(74) *Attorney, Agent, or Firm* — Wood Herron & Evans LLP

(57) ABSTRACT

Apparatus for manipulating a wind turbine blade and method of blade handling An apparatus for manipulating a wind turbine blade having fixed lifting points (2) on the blade has a blade turner base (36,62,82,100), a frame like support structure (34,64,84,112) carried on the base and connecting structures such as brackets (32,138) which (Continued)

engage in the lifting points (2) on the blade extending into openings in the blade, the support structure (34,64,84,112) having a part-circular portion or periphery at which it connects to the base, being movably supported on the base so as to rotate relative thereto about a substantially horizontal axis in order to vary the orientation of a blade supported thereon.

28 Claims, 14 Drawing Sheets

(52) U.S. Cl.
CPC ........... *F05B 2230/61* (2013.01); *Y02E 10/72* (2013.01); *Y02P 70/523* (2015.11)

(56) References Cited

U.S. PATENT DOCUMENTS

| 2006/0147308 | A1 | 7/2006 | Wobben | |
|---|---|---|---|---|
| 2006/0162645 | A1 | 7/2006 | Nohynek | |
| 2007/0177954 | A1* | 8/2007 | Kootstra | B60P 3/40 410/44 |
| 2007/0258823 | A1* | 11/2007 | Haarh | B66C 1/108 416/223 R |
| 2008/0216301 | A1* | 9/2008 | Hansen | B66C 1/108 29/428 |
| 2009/0169323 | A1* | 7/2009 | Livingston | F03D 1/005 410/120 |
| 2011/0031292 | A1* | 2/2011 | Krogh | B60P 3/40 224/553 |
| 2011/0131785 | A1* | 6/2011 | Madsen | B60P 3/40 29/428 |
| 2011/0142660 | A1* | 6/2011 | Bakhuis | B60P 3/40 416/223 R |
| 2012/0098283 | A1* | 4/2012 | Maj | B66C 1/108 294/67.1 |
| 2013/0236324 | A1* | 9/2013 | Bech | B66C 1/108 416/233 |
| 2014/0245580 | A1* | 9/2014 | Meyer | B66C 1/108 29/23.51 |

FOREIGN PATENT DOCUMENTS

| JP | 2010216317 | A | 9/2010 |
|---|---|---|---|
| WO | 03057528 | A1 | 7/2003 |
| WO | 2005071261 | A1 | 8/2005 |
| WO | 2006050723 | A1 | 5/2006 |
| WO | 2009112887 | A1 | 9/2009 |
| WO | 2009141018 | A2 | 11/2009 |
| WO | 2012034566 | A1 | 3/2012 |

OTHER PUBLICATIONS

Danish Patent and Trademark Office, Examination Report issued in Danish Patent Application No. PA 2011 70264 Jan. 26, 2012 dated.

* cited by examiner

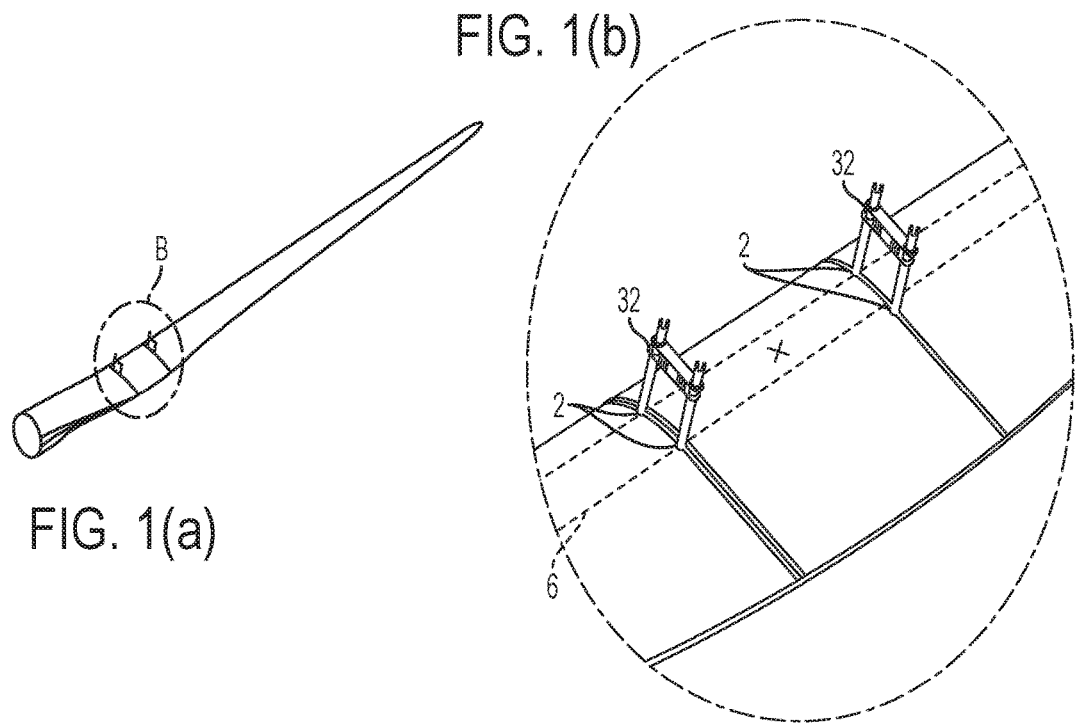
FIG. 1(a)
FIG. 1(b)
FIG. 1(c)
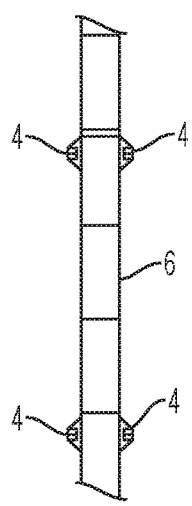
FIG. 2
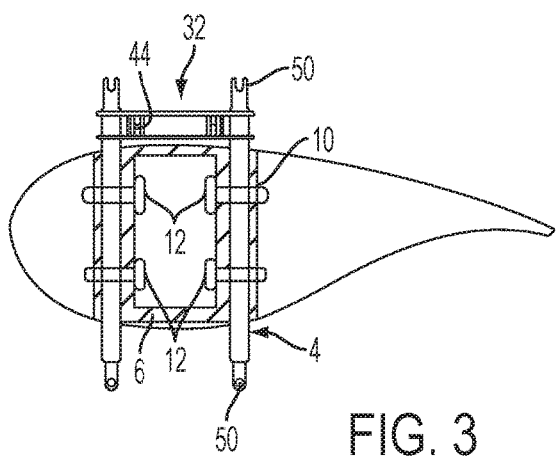
FIG. 3

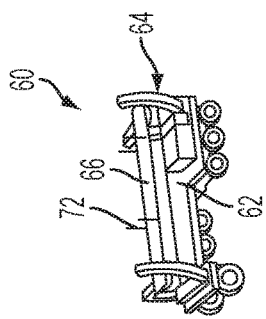
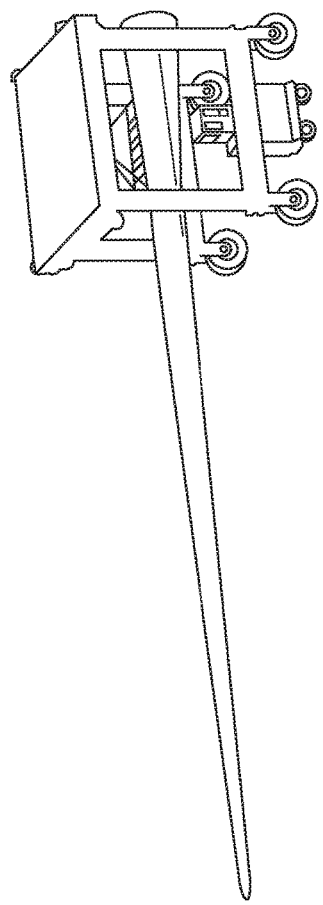
FIG. 14
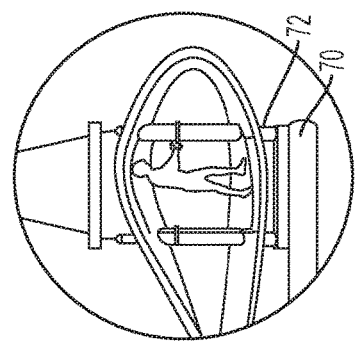
FIG. 16
FIG. 15

APPARATUS FOR MANIPULATING A WIND TURBINE BLADE AND METHOD OF BLADE HANDLING

FIELD OF THE INVENTION

The present invention relates to an apparatus for manipulating a wind turbine blade, in particular for turning a blade, for use during its fabrication, or during transport, installation or repair procedures, and to a method of blade handling using such a device.

BACKGROUND OF THE INVENTION

With the growing acceptance of wind turbines as a commercially viable source of energy, and the continuous drive for reducing the cost of the produced energy, the size of turbines continues to increase. At the time of writing, all major turbine manufacturers have turbines in the 2-3 MW range, and most are developing larger models in the 3-6 MW range. Such models will typically have rotor blades which are in the region of 50 to 70 m or even larger, and weighing in the region of 10 tonnes or more.

The handling of these large blades during manufacture, transport to the turbine site, during installation, repair or replacement becomes increasingly problematic. Conventional handling techniques involve the use of lifting cranes and slings which encircle the blades in the chordwise direction, and are connected to a crane lifting hook or eye. The use of such slings is potentially problematic in that these slings do not make a direct fixed connection to the blade, and are thereby susceptible to relative sliding of the blade within the sling. Moreover, if not carefully arranged, the slings can exert potentially damaging forces on parts of the blades, particularly the relatively delicate trailing edge. If the blade is provided with dynamically operative structures such as trailing edge flaps, these are particularly susceptible to damage. In addition, there is the potential for damage to the blade's structural integrity, in that the blade structure is designed in order to accommodate loading during normal use when in its operating position mounted at its root end on the rotor hub, and is not designed, or at least not primarily designed, having particular regard to loads during lifting when constrained at or near the central region of the blade.

It has previously been proposed in Applicant's WO2005/071261 to provide the blade with mounting holes which penetrate the top and bottom blade shells, with bracket-like handling components arranged against the opposite blade surfaces and connected by bolts extending through the mounting holes. Such a structure enjoys several benefits of thereby providing a fixed lifting point, and allowing a firm grip to be provided on the blade.

It has further been proposed in Applicant's Danish Application No. PA 2010 70399 and 2010 70401 and WO2012/034566 to provide a structure in which lift points in the form of openings are provided through the blade surface into or adjacent the internal load-bearing structure of the blade, such being configured to allow connection of a lifting assembly to the load-bearing structure.

As disclosed therein connection to these blade lifting hardpoints may be through use of a lifting assembly comprising lifting pins which are received in these lift points, and are connected either rigidly to or suspended from a lifting frame or bar, which in turn is connected to a lifting wire, strop, hook, or the like and to which a crane hook can engage.

During a blade a fabrication process, particularly at a surface finishing or painting stage it is necessary to access both sides of the blade and therefore it is generally necessary to manipulate the blade to allow such access. These blade lifting hardpoints provide a means of making connection to a blade which may then be utilised in a handling or manipulating operation.

The present invention is directed to an apparatus which is able to manipulate a blade provided with such lifting points, and to a method of handling a blade which has such a device.

SUMMARY OF THE INVENTION

In a first aspect the invention provides an apparatus for manipulating a wind turbine blade having lifting points on the blade, the apparatus comprising: a base; a support structure carried on the base; and a connecting structure on the support structure for engaging lifting points on the blade having protruding elements for engagement in openings in the blade at lifting points thereof; wherein the support structure is movably supported on the base so as to pivot or rotate relative thereto about a substantially horizontal axis in order to vary the orientation of a blade supported thereon.

The connecting structures preferably comprise brackets for receipt and engagement in openings in the blade at lifting points thereof, allowing connection either directly or indirectly into internal load bearing structures of the blade such an internal load-bearing spar or shear web, or beams, or bulkheads, or other load-bearing structures.

In a preferred form the connecting structures comprise a pair of brackets each having two protruding elements for engaging the blade lifting points, engaging for example a load-bearing spar on opposite sides of the spar. These may be separate elements which are releasably connected to the support structure, and lockable thereto by means of releasable locking pins. It may be arranged that the brackets are provided with lifting points by which they may be attached to a lifting crane or other lifting device. Employing these structures as separate elements means that they can be utilised as part of a blade lifting assembly, and allowing them to be retained within the blade and connected to form part of the blade manipulating assembly, obviating the need to remove the connecting structures after a lifting operation and attach a separate structure into the blade.

In an alternative form the connecting structures comprise a bracket having a single leg for receipt within the openings of the blade lifting points. The brackets may be further provided with clamping structures such as flanges for engaging the external blade surfaces, to provide additional support for the blade, spreading the load over a greater area.

The support structure preferably comprises a frame or frames having a curved element or periphery at which it is supported on the base, preferably of part-circular or circular form.

In one preferred form the support structures comprise a pair of frames each of generally C-shaped form defining a side opening through which a blade can be introduced. The bracket-like blade connecting structures are connectable to extend across the frames in a direction generally perpendicular to the side opening, that is to the direction in which the opening faces. More particularly, the frames comprise a peripheral part-circular member and a pair of webs joined to the part-circular member arranged on opposite sides of the side opening, the connecting brackets extending between the webs.

In an alternative form the support structures comprise a pair of frames each having a part-circular periphery and a supporting portion extending from an end of the part-circular periphery to which the blade connecting structures are joined, more preferably the frames each comprising a part-circular member one end of which is joined to an inwardly extending supporting portion. The frames carry an interconnecting crosspiece extending between the supporting portions of the two frames, and on which the blade connecting structures are arranged.

In a still further alternative the support structures comprise a pair of frames each having a part circular periphery, both ends of which are joined to a respective pair of opposed inwardly-extending supporting portions defining an opening therebetween, and to which the blade connecting structures are connected. The inwardly extending supporting portions carry a pair of interconnecting crosspieces extending between respective corresponding ends each having the blade connecting structures thereon, for simultaneous engagement of opposite sides of a blade.

The base serves to carry the support frames in a manner whereby these are is driven to rotate relative to the base. To this end the base may be provided with drive wheels which engage the part-circular element or periphery of the frame. This may be a frictional engagement of the part-circular element or periphery, or a gear arrangement may be provided between the base and the part-circular element or periphery.

In one form the base may be provided with wheels whereby the apparatus is a mobile unit which can be moved around a factory or blade storage park and positioned as desired, and/or used to transport the blade around the factory or storage facility.

In a further aspect the invention resides in an apparatus as described above in combination with a second apparatus also as described above with the base of at least one apparatus adapted to be partly receivable within the footprint of the other to allow close approach of the second apparatus when arranged alongside each other, whereby a blade can be simultaneously engaged by respective connecting structures on opposite sides of the blade. This may be achieved by providing at least one apparatus with a cut-out region whereby the base can be moved into an interlocking position with the base of the second apparatus.

In a further aspect the invention resides in a method of manipulating a wind turbine blade using the apparatus as described above, the method comprising engaging the blade with the connecting structure, and rotating the support structure relative to the base to vary the orientation of the blade thereon.

Advantageously, the connecting structure is releasably connected to the support frames, the method further comprising engaging the connecting structure with the blade prior to connection of the connecting structure to the support structure. This allows that the connecting structure can be utilised as part of a blade lifting assembly, and allowing this to be retained within the blade after a lifting or handling operation, becoming connected to form part of the blade manipulating assembly, obviating the need to remove the connecting structures after a lifting operation or to attach a separate structure into the blade.

The support structure may be separable from the base, the method further comprising engaging the support structure with the blade prior to engagement of the support structure on the base. Thus, with the blade held by the connecting structures or otherwise supported, for example on a stand, the support structures can be moved over the blade and connected to the connecting structure, by a locking action. This is further facilitated if the connecting structure is provided with lifting points, whereby the blade can be supported thereby, the method further comprising the step of lifting the blade by the lifting points on the connecting structures. Once the connection with the support structure is made the blade with support structure can be lifted onto the base, to allow a turning operation to be effected.

BRIEF DESCRIPTION OF THE DRAWINGS

Embodiments of the invention are now described, by way of example only, with reference to the following drawings in which:

FIG. 1(a) shows a blade with lifting brackets inserted into blade lifting points according to the first step of a method of manipulating a wind turbine blade in accordance with an aspect of the invention;

FIG. 1(b) is an enlarged detail of the region B of FIG. 1(a) showing the lifting brackets;

FIG. 1(c) is a perspective view of a lifting bracket:

FIG. 2 illustrates an internal load-bearing spar of the blade showing the lift points;

FIG. 3 is a schematic cross-sectional view of the blade with lifting bracket inserted and locked to the spar;

FIG. 14 shows a manipulating apparatus according to a second embodiment of the invention with a blade being carried towards the apparatus in a straddle carrier;

FIG. 15 shows the blade being lifted onto the manipulating apparatus;

FIG. 16 illustrates a step of detachment of the lifting apparatus from the internal spar;

DETAILED DESCRIPTION OF THE PREFERRED EMBODIMENTS

Figure 4:
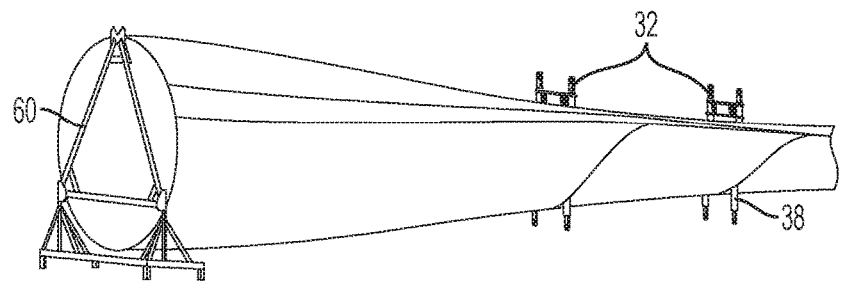
FIG. 4 shows a blade in a storage configuration with lifting brackets installed.

As discussed above, it has previously been proposed in applicant's WO 2005/071261 and Danish PA 2010 70399, PA 2010 70401 and WO2012/034566, the contents of which are incorporated herein, to provide a wind turbine blade with lifting points formed in the blade. As particularly described in WO2012/034566, the blade is provided with lifting points, most preferably four such lifting points, provided spaced equidistantly about the blade's centre of gravity and to which a lifting assembly is attached, whereby when lifted the blade adopts a balanced orientation. These lifting points include adaptation whereby load bearing connection is made either directly or indirectly with internal load-bearing structures within the blade, such as a load-bearing spar or shear web or webs, or beams or bulkheads or other load carrying structures of the blade, or to structures connected to such load-carrying structures.

Before describing the blade manipulating apparatus of the invention, the blade features of the lifting points are discussed. FIGS. 1 to 3 illustrate adaptations of the blade which allow lifting by a lifting assembly, with FIG. 3 showing a lifting bracket which forms part of the manipulating apparatus of the present invention being used as part of a lifting assembly.

At the lifting points, indicated 2 the blade is formed with respective shear tubes 4 arranged adjacent to and structurally connected to the internal load-bearing structure or structures within the blade, here illustrated as being a spar 6. FIG. 2 shows the spar 6 along with shear tubes 4 spaced on opposite sides of the spar 6. The shear tubes 4 extend from and open out at the upper blade surface (that is 'upper' in the typical lifting orientation in which the suction surface of the blade is uppermost), extending to the lower blade surface where they also open out at this lower blade surface. These shear tubes 4 receive lift pins or spigots 8 of the lifting assembly. Part-way along the length of the shear tubes aligned lateral openings 10 are provided through the shear tubes and spar shear web for receiving locking shear pins 12 of the lifting assembly. It may be arranged that each shear tube 4 has a single lateral opening which lies approximately at its midpoint preferably on the neutral axis, or there may be more than one lateral opening for example a pair of openings one below and one above the neutral axis, as shown in FIG. 3. Other forms of mechanical locking structures for locking the lift pins within the shear tubes may be provided.

The lifting assembly comprises four lift pins associated with the respective lifting points, each being of cylindrical or tubular form of circular section (or section to match the shear tube section if non-circular, for example they might be of hexagonal section) each having an upper connecting eye for connection by a length of wire, cable or chain or rope or to lifting spreader then to a crane lifting eye to which a crane hook can be connected. Each lift pin 8 is formed with transverse openings which receive the shear pins 12, with these openings aligned with the openings within the shear tube 4 and the spar shear web when fully inserted within the shear tube 4. The shear pin 12 is insertable from the interior of the spar 6 in the chordwise direction through these aligned openings.

Figure 22:
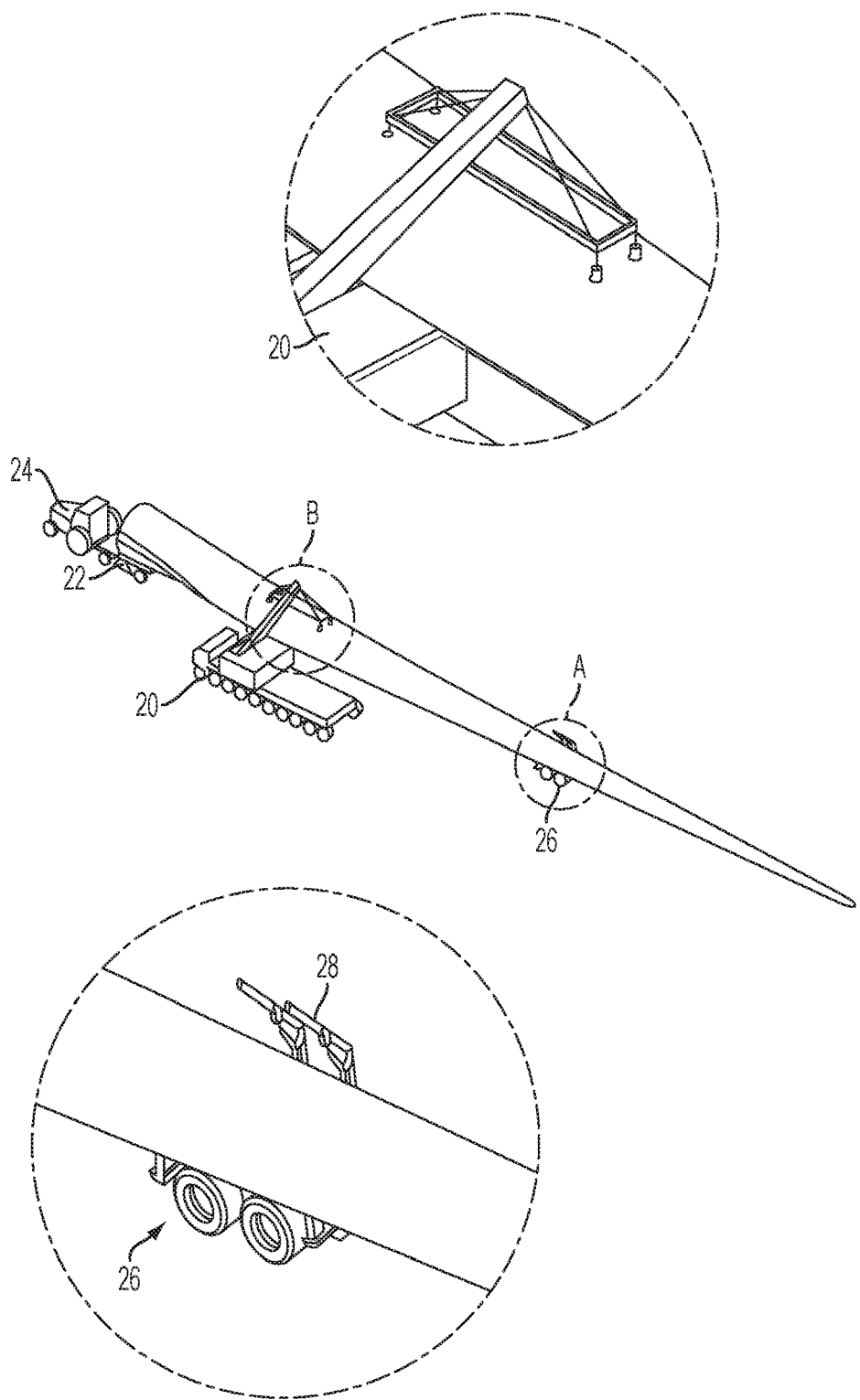
FIG. 22 shows a blade being handled by its lifting points as part of a transport operation.

FIG. 22 shows a blade being handled using the lifting assembly 1, with the lifting pins of the assembly locked to the blade. Here a mobile crane 20 is lifting a blade from (or to) a blade transport arrangement as is used within a blade factory or blade storage or loading park, with the blade root end carried on a root trolley 22 connected to a tractor 24, and with a tip trolley 26 supporting the blade at a position partway between its centre of gravity and its tip. The tip trolley 26 may have a remote-controlled clamping system 28 operable for example by service personnel within the crane 20 or tractor 24.

Figure 11:
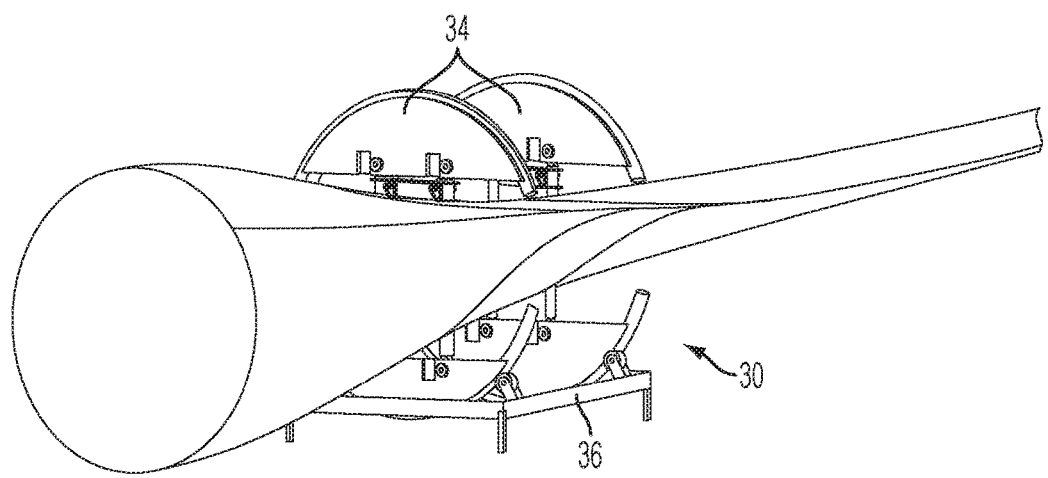
FIG. 11 show the blade with support structures mounted on a turner base of the apparatus.
Figure 12:
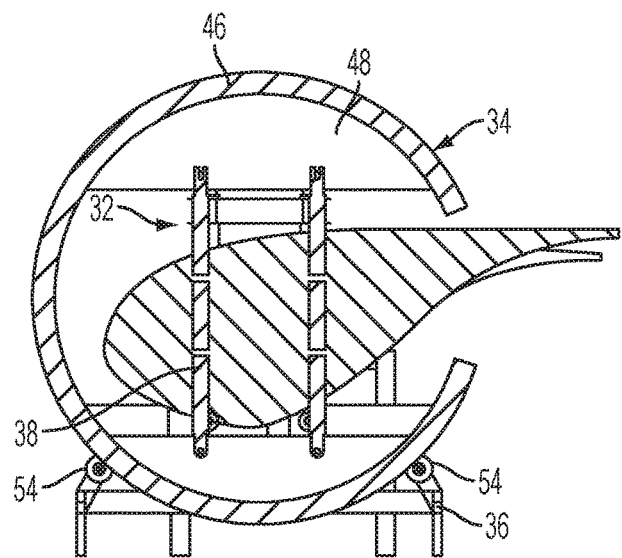
FIG. 12 is a cross-sectional view of the blade in the turner base.
Figure 13:
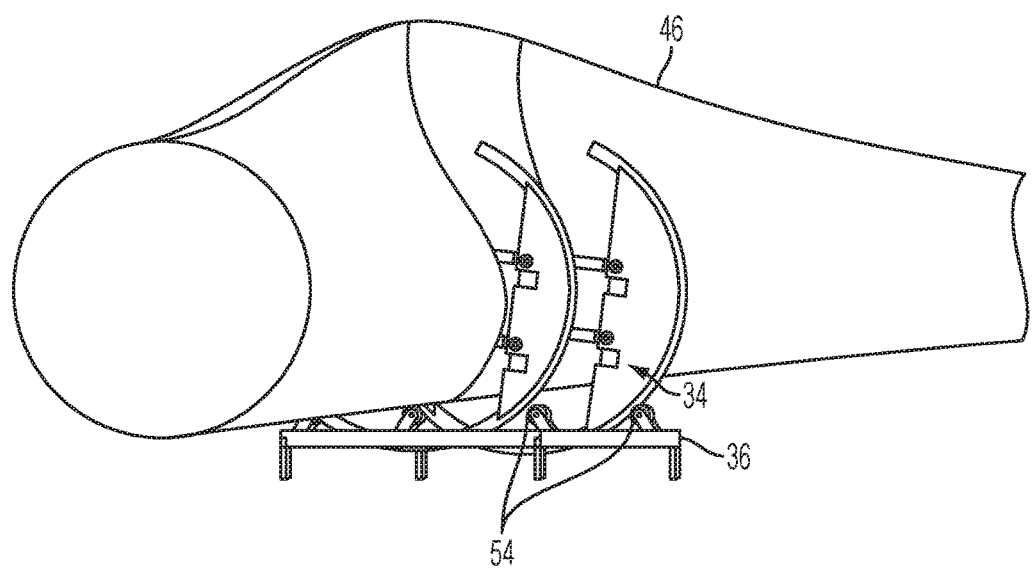
FIG. 13 shows a blade undergoing a turning operation.

As best seen in FIGS. 11 to 13 the blade manipulating apparatus in accordance with a first embodiment of the invention is shown in complete operative form. The apparatus, indicted 30, comprises three primary structural components, including blade connection structures in the form of blade brackets 32 which make connection to the blade, support frames 34 to which the brackets 32 are connected, and a turner base structure 36 on which the support frames sit and by which the frames and blade carried thereby can be rotated about a generally horizontal axis.

Figure 9:
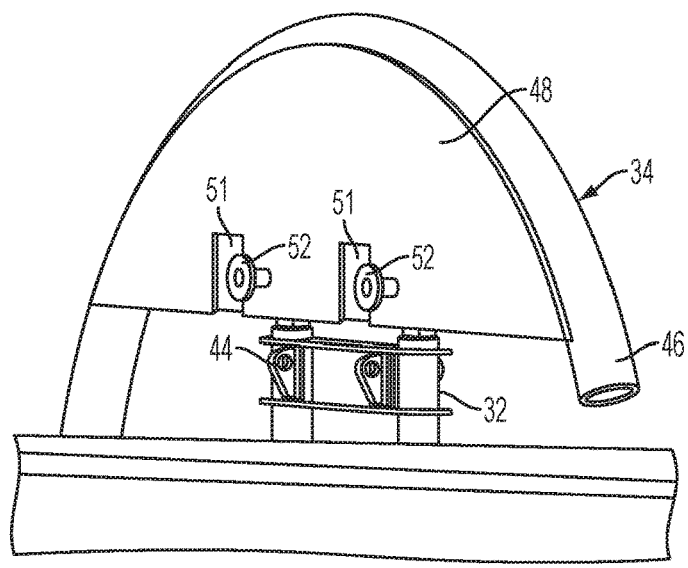
FIG. 9 is a further enlarged detail showing the connection between support structure and lifting bracket.

Returning to FIG. 1(c), this shows a blade bracket 32. This comprises a pair of depending legs or pins 38 for receipt in the shear tubes 4 of the blade lifting points interconnected by a crosspiece 40. The legs 38 are formed with the openings 42 through which the shear pins 12 are passed to lock the bracket to the blade. Lifting eyes 44 most clearly seen in FIG. 9 are formed on the bracket 32, conveniently on the crosspiece 40, these serving as attachment points for a lifting straps, tapes, wires, shackles or the like for attachment to a crane or hoist or other lifting device or machine. Although shown interconnected, the legs or pins 38 may alternatively be separate components to which to which lifting connection can individually be made, or may be separate components which can be interconnected by a bridging structure. In use the brackets extend entirely through the blade between opposite faces.

The support frames 34 provide a curved periphery which can be engaged to effect the turning operation as further discussed below, conveniently comprising a generally C-shaped part-circular curved tubular element 46 having a pair of opposed and spaced web elements 48 to which opposite ends of the brackets 32 are releasably securable. These ends of the brackets 32 are received in slots 51 in the web elements defining seats whereby the legs 38 when fitted therein lie symmetrically within the tubular element 46 and in the plane thereof. The opposite ends of the legs 38 are formed with lugs or openings 50 through which bolts or locking pins 52 are inserted into openings in the web elements 48. For this purpose the pins 52 may be formed with a screw thread for receipt in threaded openings in the web elements 48. This releasable connection allows the brackets 32 to be secured to the blade, indeed used as part of a lifting assembly, prior to connection to the support frames 34 and to the remainder of the apparatus, as discussed further below.

The support frames 34 sit in the turner base structure 36. This base structure 36 comprises a floor mounted structure having a pair of drive stations associated with the two support frames 34, to support and engage the frames 34 at one or more points at or near the lowermost edge. As shown in FIGS. 12 and 13 the support frames sit against a pair of drive wheels 54 which serve to take the weight of the support frames 34 and blade carried thereon, and to provide a driving torque for rotating the blade. These drive wheels are either directly driven by a motor, or operatively connected to a drive motor (not illustrated).

It will be appreciated that a variety of other mechanical structures can be provided in the turner base 36 for rotatably supporting and driving the support frames 34. For example, there may be provided a bearing structure or arrangement of non-driven rollers which serve to take a primary part of the weight, and with drive rollers driven by a motor serving to provide the rotational drive force. As a further alternative, the rotational drive might be provided by a gear arrangement between motor and support frame, such as a rack and pinion-type drive with a rack structure provided on the curved periphery of the support frame, and a pinion or other gear structure within the turner base 36.

Figure 5:
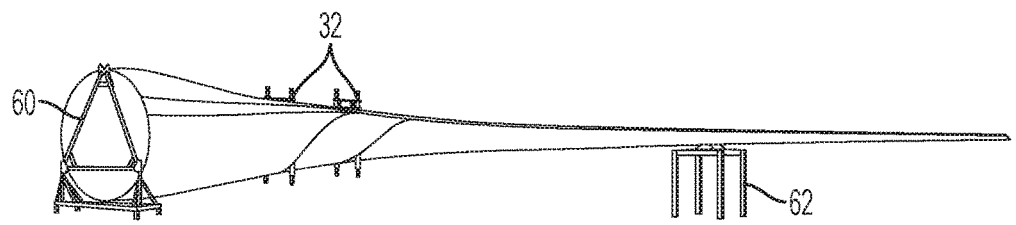
FIG. 5 shows a blade in a storage configuration illustrating also support of the tip.

The manipulating apparatus of the invention finds particular applicability in turning a blade as part of a fabrication process, for example in surface finishing or painting, or as part of a surface repair, or as part of a testing process, such as a static or fatigue test. FIGS. 4 to 13 illustrate a typical sequence of operations involved in turning a blade. FIGS. 4 and 5 show a blade supported at a root end in a conventional stand 60 which makes connection for example to the openings provided for receiving the blade bolts by which the blade is secured to the blade bearing. The blade is further supported towards its tip on a tip stand 62. Typically, the blade will have been moved to this position in order to carry out a particular fabrication step or process. FIGS. 4 and 5 show brackets 32 fitted within the lifting points 2. As illustrated in FIG. 3 the brackets are locked to the blade with their legs 38 extending through the shear tubes 4, being locked therein by the shear pins 12. These brackets 32 may be used as a means to lift the blade within the fabrication process, for example the blades may be lifted from a blade mould by a crane, where lifting wires or the like are connected to the lifting eyes 44, and then transported by the crane to this location at which a finishing process is to be performed. Alternatively, the blade may have been moved by some other means to this location at which the brackets 32 are then fitted.

Figure 6:
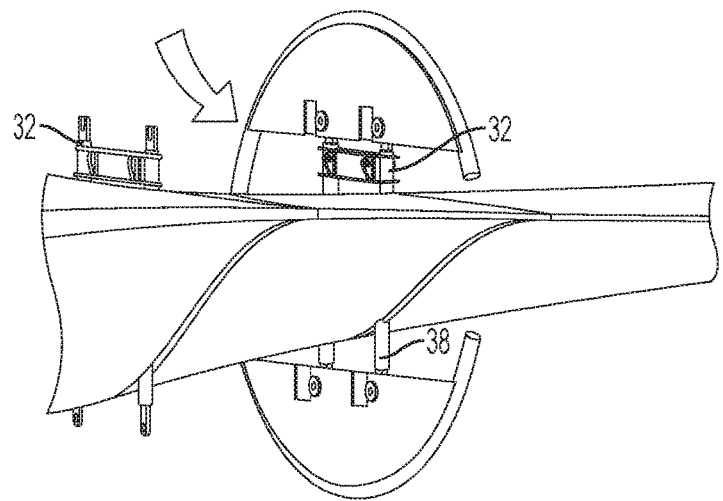
FIG. 6 shows a clamp of the manipulating apparatus according to an embodiment of the invention secured to one lifting bracket.
Figure 7:
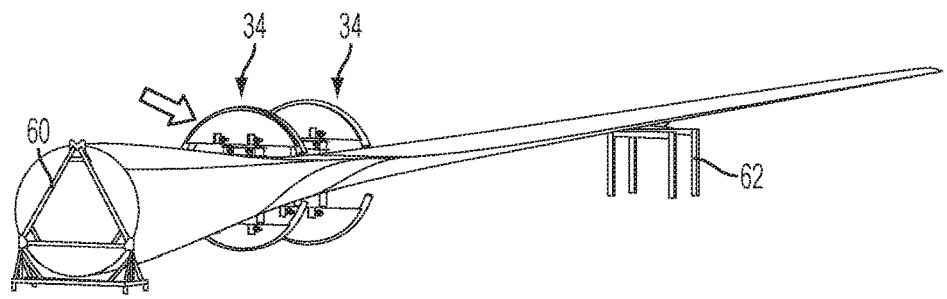
FIG. 7 shows the blade with clamps secured to both brackets.
Figure 8:
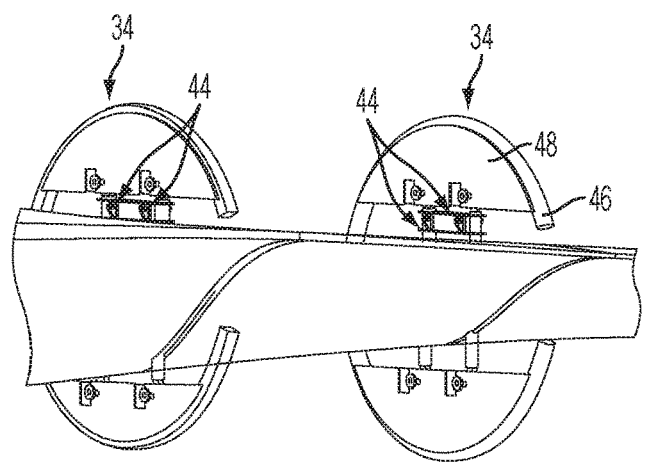
FIG. 8 is an enlarged view of the two clamps secured to the lifting brackets.

As illustrated in FIGS. 6 and 7 the two C-shaped support frames 34 are each fitted over the blade, being lifted by a crane and translated in the direction of the arrows over the blade so that the open side passes over the blades leading (or trailing) edge and the frame encloses the blade. The support frames 34 are then secured to the brackets 32 by engaging the frames 32 against the opposite ends of the pins 38 at the positions of the locking pins 52, and securing the locking pins 52.

Figure 10:
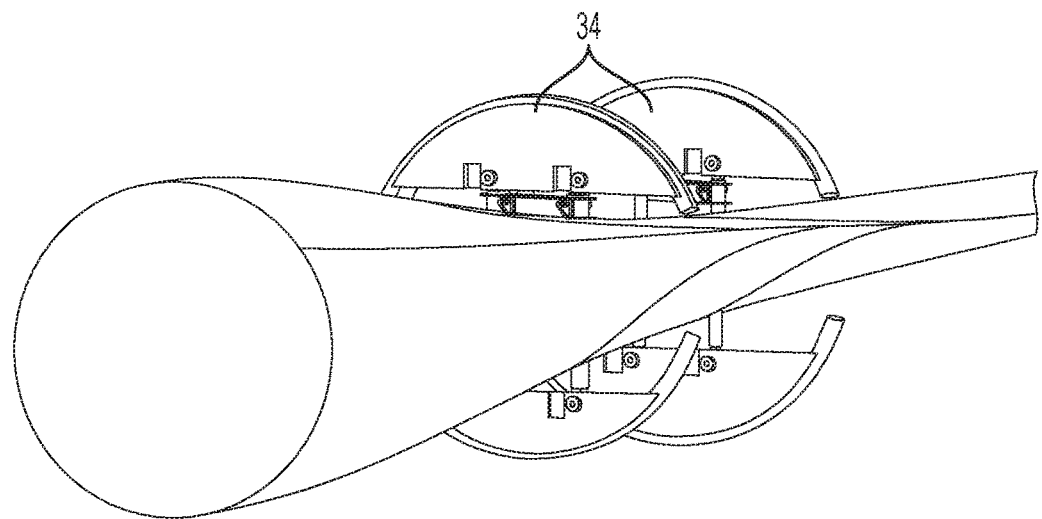
FIG. 10 shows the blade with supports structures being lifted into position.

FIG. 10 shows both support frames 34 fitted to the blade. From here depending upon the physical arrangement of lifting apparatus, blade elevation etc, the blade with support frames attached, is then lifted and moved onto the tuner base 36, or the blade lifted and the turner support base 36 slid into position underneath the blade and the blade lowered to rest thereon. FIG. 12 shows the blade in position in the turner base 36. As illustrated in FIG. 13 the turner base 36 can then be use to drive the rotation of the blade, FIG. 13 showing a position where the blade has been rotated by about 90 degrees from the FIG. 12 position, with its trailing edge extending upwardly. Rotation of up to about 180 degrees is possible with the apparatus, allowing convenient access to both faces of the blade, for example as part of a surface finishing, painting, repair or inspection process. As can be seen the apparatus is very compact, occupying a very limited floor space, whilst none the less being able to manipulate very large blades.

Although the apparatus described makes connection to four lifting points located equidistantly about the blade centre of gravity, it may also be arranged that the lifting points are located away from the centre of gravity, for example a pair of lifting points may be located near the blade root and a pair close to the blade tip. In this case the apparatus comprises a first turner base associated with one pair of lifting points having a first support frame thereon, and a second turner base having a second support frame thereon. Alternatively, one pair of lifting points may be omitted and some other structure utilised to support the blade, for example a crane with lifting sling, that is the turner may be used in conjunction with a crane.

Although the aforedescribed embodiment makes connection to a blade in which lifting points are arranged in pairs, with suitable adaptation to blade and apparatus instead of a pair of lifting points spaced across the blade chord at a given blade radius, a single lifting point may be provided. FIGS. 14 to 19 illustrate a second embodiment of an apparatus for blade manipulation for making connection to a single lifting point.

FIGS. 14 to 19 illustrate a second embodiment of an apparatus for blade manipulation. The apparatus takes the form of a mobile unit 60 having a turner base 62 here provided with wheels whereby it may be driven around the factory or blade storage park. The turner base 62 carries a pair of spaced generally curved frames 64, interconnected by a cross member 66. More particularly, the frames 64 each comprise a main part-circular portion 68 and extending from an end of the part-circular portion 68, an inwardly extending support portion 70 to which the cross member 66 is connected. Blade connecting structures in the form of connecting pins 72 which are adapted to engage within the blade lifting points 2 are arranged to extend from the cross member 66. These are configured to be locked to the blade in a similar manner to that as discussed above, that is by means of lateral locking pins inserted into the shear tubes. It may be arranged however that the connecting pins 72 are of more limited length extending only part way through the shear tubes for example up to a midpoint, whilst the connecting pins of any lifting apparatus likewise extend only part way through the shear tubes, whereby the blade can be simultaneously engaged from opposite sides.

Although not shown, the turner base 62 is formed with drive structures which are able to drive the frames 64 to rotate, such drive structures taking the form of drive wheels or gears or other mechanical arrangements as discussed above.

Figure 17:
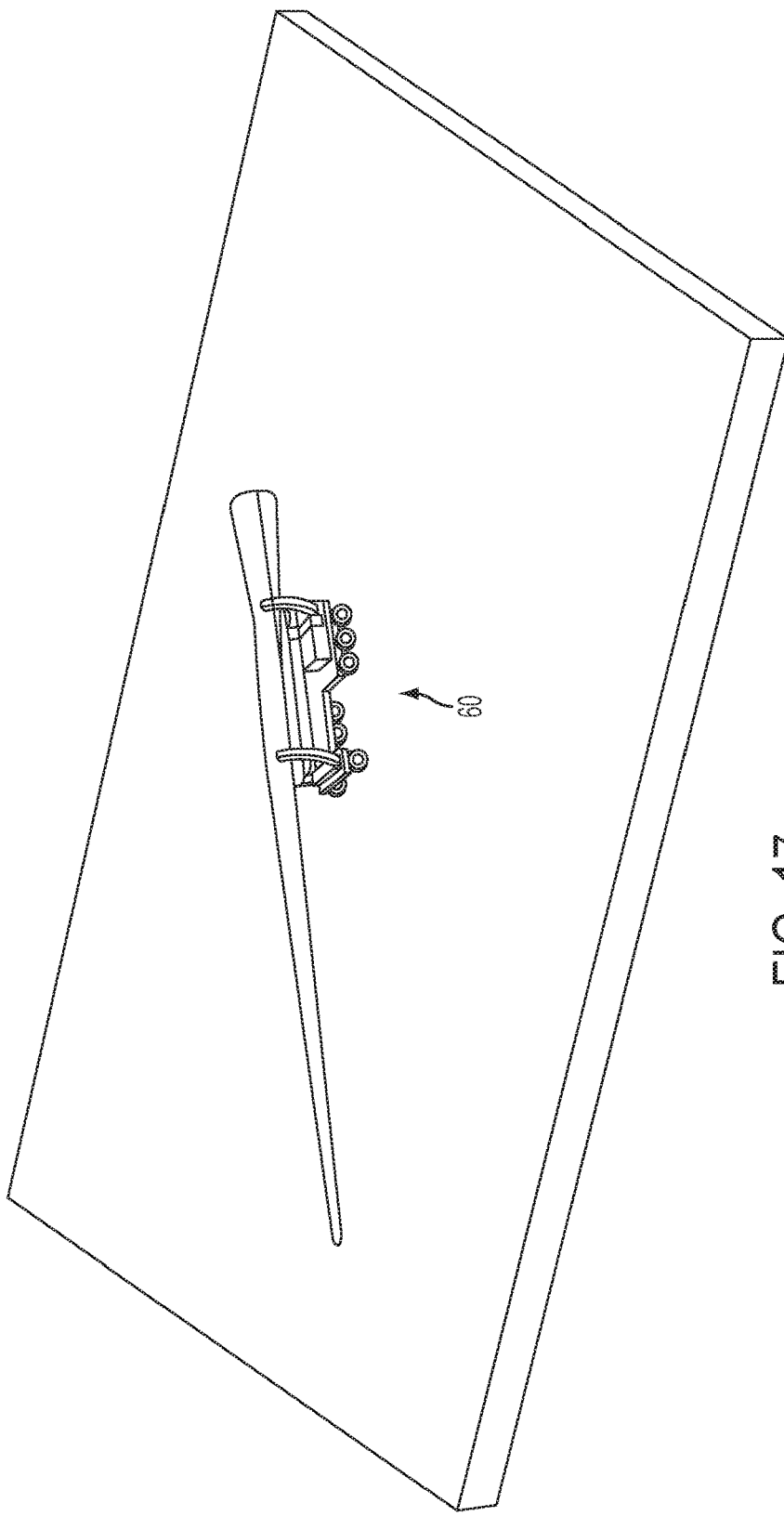
FIG. 17 shows a blade fitted to the manipulating apparatus according to the second embodiment of the invention.
Figure 18:
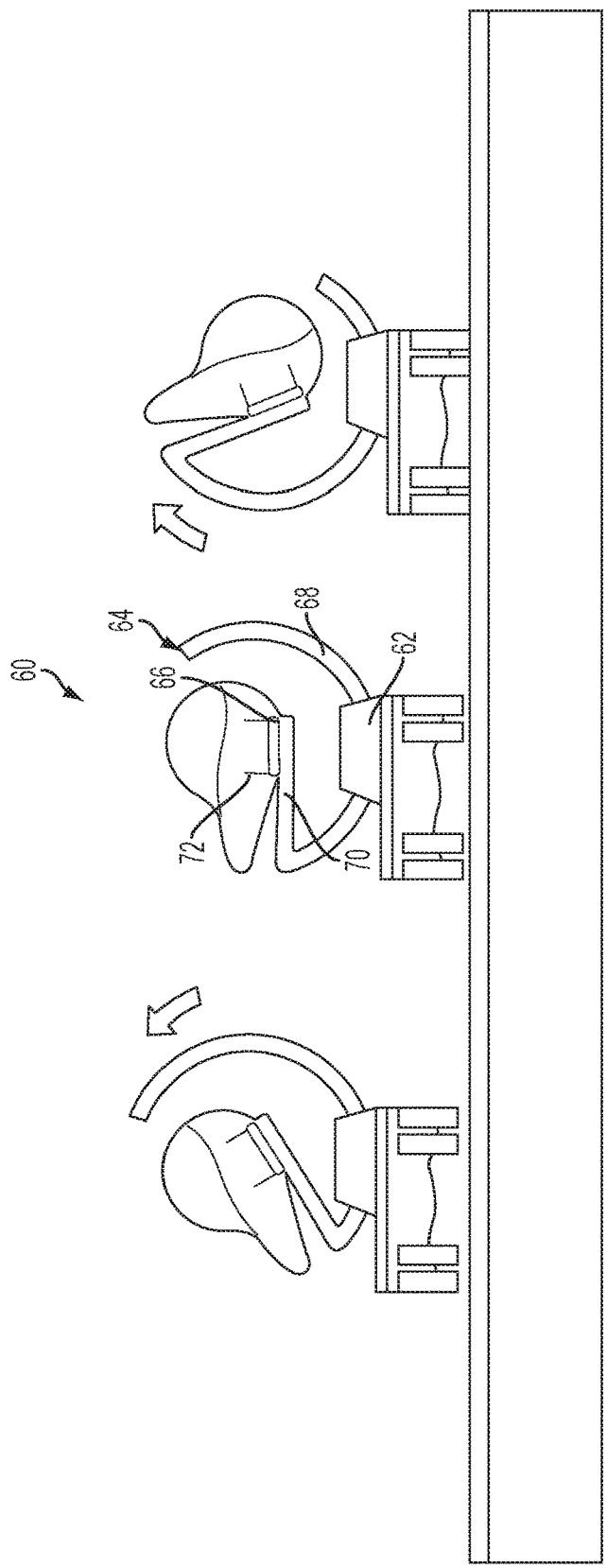
FIG. 18 illustrates a turning operation effected by the manipulating apparatus.

FIG. 14 shows a blade being lifted so as to position the blade on the blade manipulating apparatus 60. The blade is supported beneath a straddle carrier by means of a lifting assembly which attaches to the blade lifting points in the manner as discussed above. The straddle carrier is moved over the blade manipulating apparatus 60 (or the apparatus moved underneath the straddle carrier) and the blade lowered (FIG. 15) onto the manipulating apparatus 60 mating the openings in the blade underside with the connecting pins 72. The blade is then locked to the connecting pins 72 inserting the shear pins through the lateral openings in the shear webs and shear tubes, and is unlocked from the lifting assembly by removing the associated shear pins, as indicated in FIG. 16. The blade may be moved to a position at which further processing make take place by moving the unit 60 as shown in FIG. 17. FIG. 18 illustrates that the blade manipulating apparatus may rotate the blade clockwise or anticlockwise about its axis between end positions about 180 degrees apart, for example to facilitate a surface finishing, painting, inspection or repair process, or as part of a blade storage or transport process.

Figure 19:
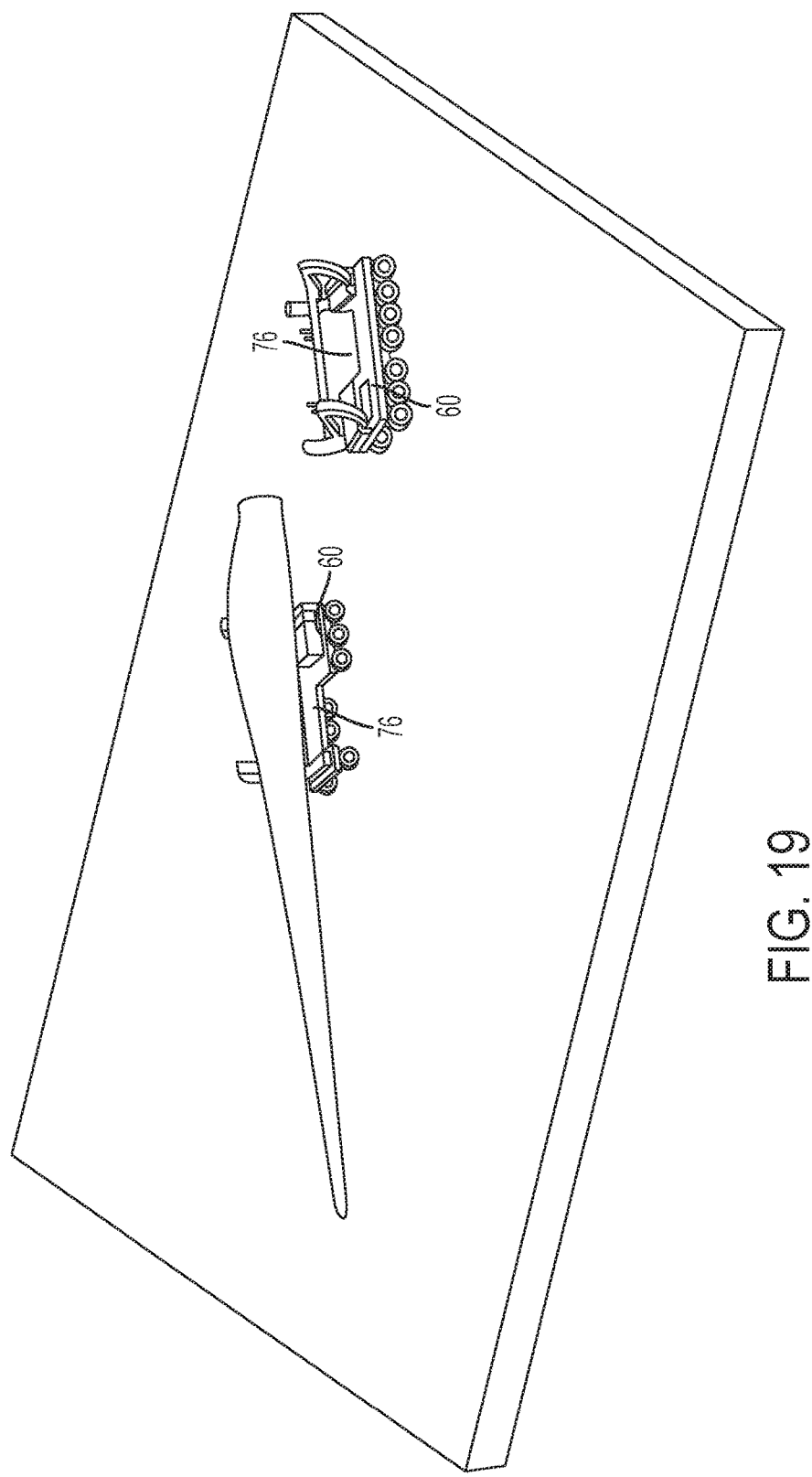
FIG. 19 illustrates the use of a pair of manipulating apparatus according to this second embodiment off the invention.
Figure 20:
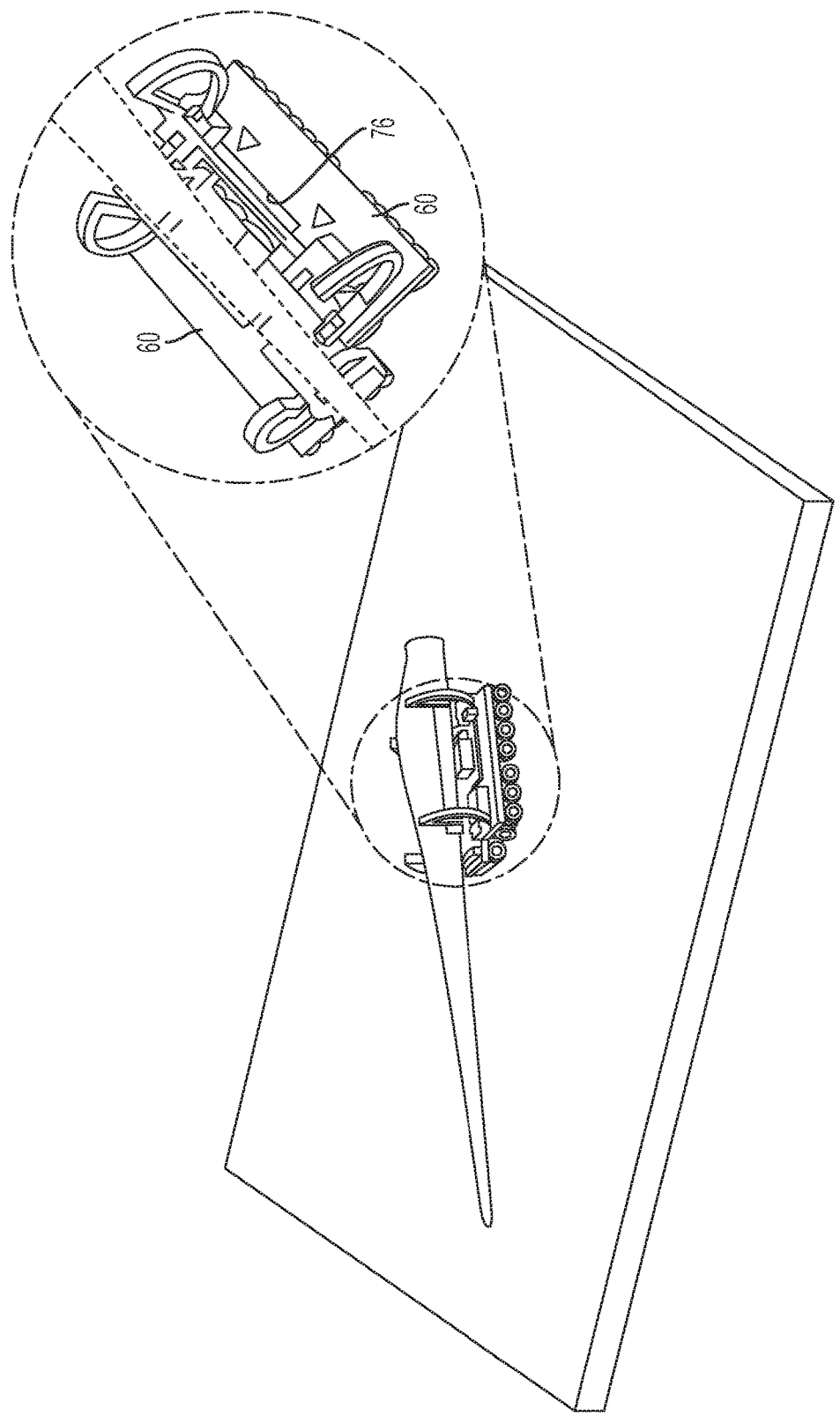
FIG. 20 shows a step of bringing a second apparatus into proximity with a first in order to engage an opposite side of the blade.

FIGS. 19 and 20 show the use of a second blade manipulating apparatus 60 of identical form utilised in an operation of transferring a blade from one apparatus to the other, so that it can then be supported at its opposite side. To facilitate this, the base turner 62 has a plan form which includes a cut out region 76 whereby the two base turners can be brought closely alongside each other in an interlocking arrangement. As indicated in FIG. 20 the blade is held at a first side in a first apparatus 60 in a vertical trailing edge up orientation and the second apparatus brought alongside the first in an interlocking manner with the support frames 64 and connecting structures 72 disposed in the same orientation for vertical carrying, and the second apparatus moved towards the first so that the connecting pins 72 engage in the lifting points at the opposite side of the blade. The connecting pins 72 are locked into the lifting points on this opposite side of the blade, whereby the blade is simultaneously supported at both sides. The connection at the first side is then released, and the first apparatus moved away from the second, whereby the blade is now held only at the second side, allowing the first side to be fully accessible, for example to be worked on in a blade finishing process. This procedure is particularly advantageous for a process which requires access to the complete blade surface, for example a painting process.

Figure 21:
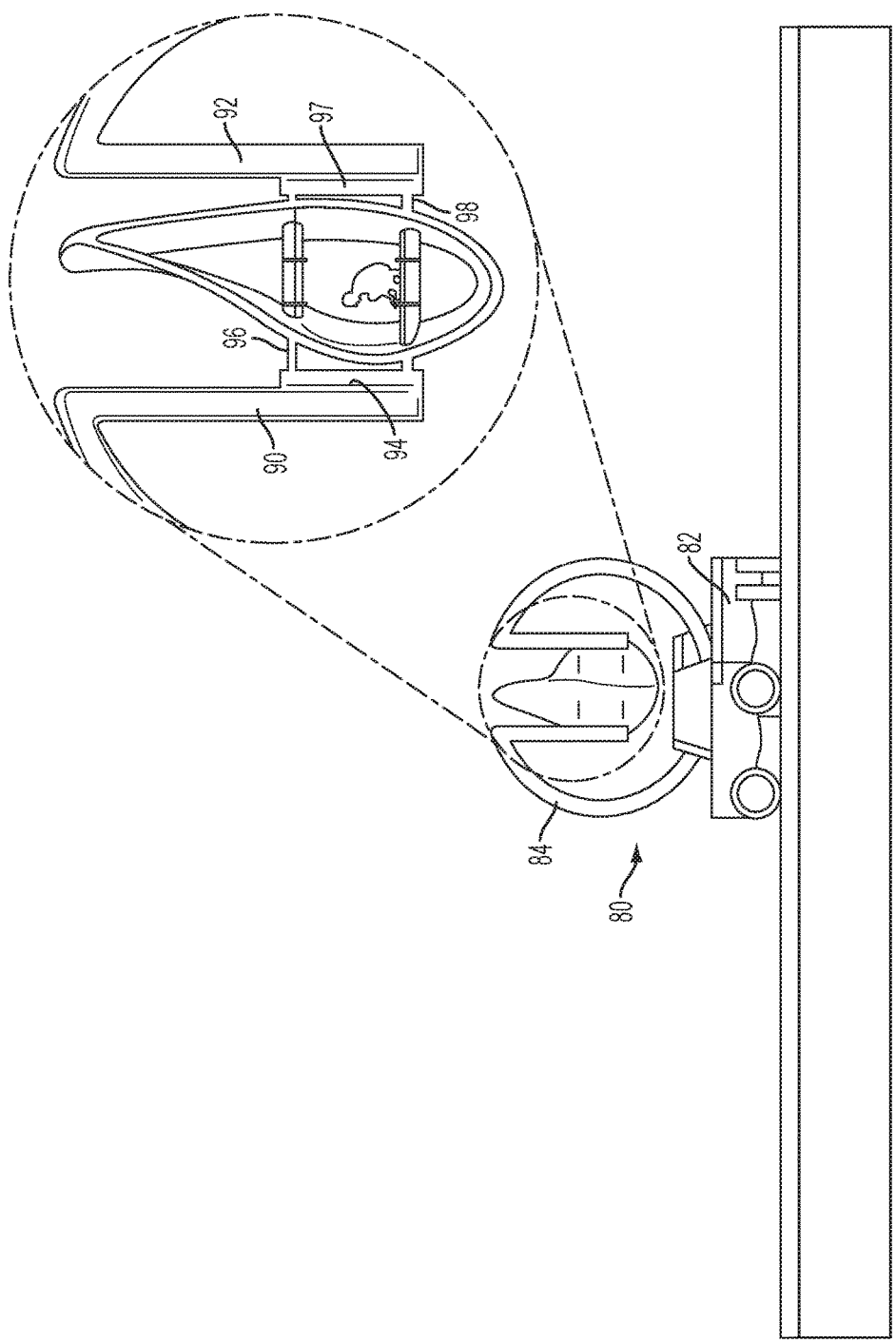
FIG. 21 shows a manipulating apparatus according to a third embodiment of the invention.

FIG. 21 illustrates a blade manipulating apparatus 80 according to a third embodiment of the invention. This has a structure which is generally similar to that of the second embodiment. It includes a base turner 82 again provided with wheels whereby the apparatus 80 is a mobile unit, and a pair of interconnected frame structures 84 (of which only one is visible in the figure) carrying the blade connecting structures thereon, and supported on the turner base 82 in a manner whereby the frames can be driven to rotate. In contrast to the second embodiment the frames comprise a part-circular curved element 88 which subtends a near circle but from which extend inwardly both first and second support portions 90, 92 these being opposed and defining a blade—receiving opening therebetween. The first support portions 90 of the two frames are interconnected by a first crosspiece 94 on which are disposed the connecting pins 96 for engaging a first side of the blade. The second support portions 92 are likewise interconnected by a second crosspiece 97 carrying the connecting pins 98 for engaging the opposite side of the blade.

As is shown, this apparatus can simultaneously engage both sides of the blade. Moreover, it allows rotation through a very large angle, of over 300 degrees without requiring the blade to be transferred to a second apparatus or any other kind of lifting device.

Figure 23:
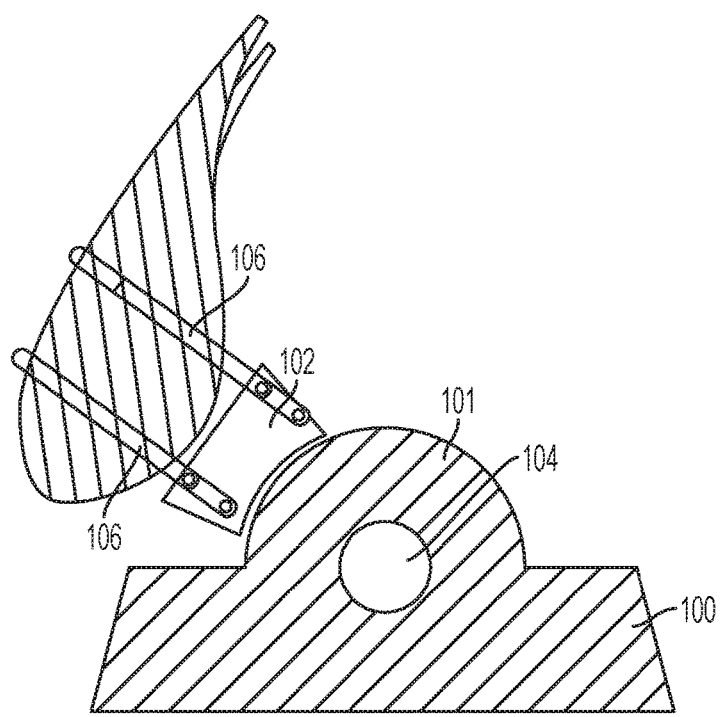
FIG. 23 shows a manipulating apparatus according to a fourth embodiment of the invention.

FIG. 23 illustrates a blade manipulating apparatus according to a fourth embodiment of the invention. A turner base structure 100 is shown having an enlarged lower region and an upstanding portion 101 of part-circular outer form from which extends a pivotably mounted support structure 102. The support structure 102 is mounted to extend from a shaft 104 to allow its rotation about a generally horizontal axis. The support structure 102 carries two pairs of blade connecting structures 106 in the form of connecting pins, upstanding from the support structure 102 of which one pair is visible, for engagement in the blade lifting points in the manner as described above. Note that the pins may or may not extend through the complete thickness of the blade. The support structure 102 is driven to move on its shaft 104 through the action of a drive motor and gear connection (not illustrated) arranged between the base 100 and shaft or support structure 102. The apparatus allows movement of the blade between a leading edge down configuration as illustrated, to a position where the blade is on the opposite side of the apparatus with the leading edge facing up.

Figure 24:
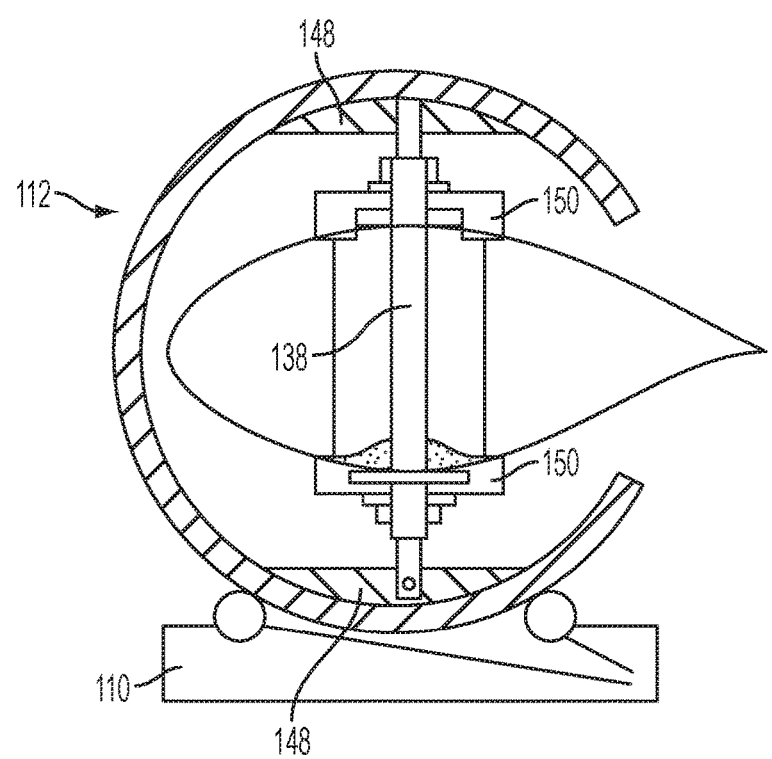
FIG. 24 shows a blade manipulating apparatus according to a fifth embodiment of the invention.

FIG. 24 shows a blade manipulating apparatus according to a fifth embodiment of the invention. This is generally similar to the earlier-described embodiment of FIGS. 11 and 12 in that it includes a base 110 on which is carried a pair of support frames 112 (of which only one is visible in the figure) of generally C-shaped form spaced in the blade longitudinal direction for supporting the blade at two locations preferably spaced on opposite sides of the blade's centre of gravity. Each frame 112 carries a blade connecting structure in the form of a single bracket 138 which extends between webs 148 arranged at opposite sides of the frame 112 and has the form of a leg or spigot which in use extends through openings aligned in opposite faces of the blade. The bracket 138 is likewise releasably connected to the webs 148 and is formed with lifting points at one or both ends whereby the blade can be lifted through the brackets 138 when disconnected from the turner.

The brackets include adaptations whereby they can be locked directly or indirectly to the load-bearing structure of the blade, for example to an internal spar or web or beam, or bulkhead or other load-carrying structure, or to a structure which makes connection to such load bearing structure. In order to increase the distribution of loading between bracket and blade, the blade may be formed with clamping flanges 150 which bear against the outer faces of the blade. In a preferred version, the flanges 150 may be moved relative to the brackets, to allow them to be moved tightly against the blade surfaces, for example, a screw thread may be provided between flange and bracket, or locking pins or other structures may be provided. The base 110 is provided with rollers for supporting in rotatable manner the support frames 112 in similar manner to the FIGS. 12 and 13 embodiment, and a drive for effecting the rotational movement. The blade can thus be manipulated in similar manner as described above, the turner allowing rotation of the blade about its longitudinal axis.

The clamping flanges can if so desired also be provided on the brackets of the earlier-described embodiments for additional load distribution.

It may also be arranged that the turner of FIG. 24, instead of carrying two spaced support frames, carry only a single such frame, but that two such turners be used. For example, the blade may have lifting points in the vicinity of the blade root, and the blade tip, with separate turners provided for each. If additional lifting points are provided, additional turners may be utilised associated with the lifting points.

The apparatus of the invention is able to conveniently, quickly and safely, effect manipulation, particularly turning, of very large blades, as may be required during blade fabrication or finishing, or a may be required as part of a blade transport solution, for example as part of a blade storage, stacking or loading operation.

Although the invention has been described above in connection with preferred embodiments of the invention, it will be evident for a person skilled in the art that various modifications are conceivable without departing from the scope of the invention as defined by the following claims.

The invention claimed is:

1. An apparatus for manipulating a wind turbine blade, the blade including a plurality of lifting points on the blade and an internal load bearing structure, each lifting point having a respective and discrete opening in the blade, the apparatus comprising:
a base;
a support structure carried on the base; and
at least one connecting structure for engaging the blade, wherein the support structure is movably supported on the base so as to pivot or rotate relative thereto about a substantially horizontal axis in order to vary the orientation of the blade supported thereon, and wherein the at least one connecting structure includes a bracket having a plurality of protruding legs, each protruding leg configured for engagement in the respective opening in the blade at one of the lifting points on the blade and configured for structural connection to the internal load bearing structure.

2. The apparatus according to claim 1 wherein the at least one connecting structure comprises a pair of brackets, each bracket having two protruding legs, and each protruding leg configured for engaging the respective opening at one of the lifting points on the blade.

3. The apparatus according to claim 1 wherein the bracket of the at least one connecting structure is releasably connected to the support structure.

4. The apparatus according to claim 3 wherein the bracket of the at least one connecting structure is connected to the support structure through releasable locking pins.

5. The apparatus according to claim 1 wherein the bracket of the at least one connecting structure is provided with lifting points by which the at least one connecting structure may be attached to a lifting crane or other lifting device.

6. The apparatus according to claim 1 wherein the support structure comprises at least one frame having a part-circular or circular curved element or periphery at which it is supported on the base.

7. The apparatus according to claim 6 wherein the support structure comprise a pair of frames each of generally C-shaped form defining a side opening through which a blade can be introduced.

8. The apparatus according to claim 7, wherein the at least one connecting structure extends across the frames in a direction generally perpendicular to the side opening.

9. The apparatus according to claim 6 wherein the at least one frame comprises a peripheral part-circular member and a pair of webs joined to the part-circular member arranged on opposite sides of the side opening, the at least one connecting structure extending between the webs.

10. The apparatus according to claim 6 wherein the base is provided with drive wheels which engage the part-circular element or periphery of the frame.

11. The apparatus according to claim 10 wherein the drive wheels frictionally engage the part-circular element or periphery.

12. The apparatus according to claim 6 wherein a gear arrangement is provided between the base and the part-circular element or periphery.

13. The apparatus according to claim 1 wherein the support structure is driven to rotate relative to the base.

14. The apparatus according to claim 1 wherein the base is provided with wheels whereby the apparatus is a mobile unit.

15. The apparatus according to claim 1 wherein locking means are provided for locking the protruding legs to the blade when inserted in the respective openings.

16. The apparatus according to claim 1 wherein the openings in the blade are defined in shear tubes of the blade, the protruding legs of the at least one connecting structure configured to be slidingly receivable in the shear tubes.

17. The apparatus according to claim 16 wherein the shear tubes are structurally connected to the internal load bearing structure of the blade.

18. A method of manipulating a wind turbine blade comprising:

providing an apparatus for manipulating the wind turbine blade, the blade including a plurality of lifting points on the blade and an internal load bearing structure, each lifting point having a respective and discrete opening in the blade, wherein the apparatus comprises a base, a support structure carried on the base, and at least one connecting structure for engaging the blade, wherein the support structure is movably supported on the base so as to pivot or rotate relative thereto about a substantially horizontal axis in order to vary the orientation of the blade supported thereon, and wherein the at least one connecting structure includes a bracket having a plurality of protruding legs;

engaging the blade with the at least one connecting structure by inserting each of the protruding legs of the bracket in the respective opening in the blade at one of the lifting points on the blade so that the protruding legs are connected to the internal load bearing structure; and rotating the support structure relative to the base to vary the orientation of the blade thereon.

19. The method according to claim 18 wherein the at least one connecting structure is releasably connected to the support structure, the method further comprising engaging the at least one connecting structure with the blade prior to connecting the at least one connecting structure to the support structure.

20. The method according to claim 19 wherein the at least one connecting structure is provided with lifting points, the method further comprising the step of lifting the blade by the lifting points on the at least one connecting structure.

21. The method according to claim 20 wherein the support structure is engaged with the at least one connecting structure by lifting the support structure over the blade into engagement with the at least one connecting structure and locking the support structure thereto.

22. The method according to claim 21 wherein the blade with support structure thereon is lifted onto the base.

23. The method according to claim 18 wherein the support structure is separable from the base, the method further comprising engaging the support structure with the blade prior to engagement of the support structure on the base.

24. The method according to claim 18 wherein the openings in the surface of the blade are defined in shear tubes of the blade, wherein the shear tubes are structurally connected to the internal load bearing structure, and wherein engaging the blade with the at least one connecting structure further comprises inserting each of the protruding legs into a respective shear tube of the blade.

25. An assembly, comprising:
a wind turbine blade having a plurality of lifting points and an internal load bearing structure, each lifting point having a respective and discrete opening defined in a surface of the blade; and
an apparatus for manipulating the wind turbine blade, the apparatus comprising:
a base;
a support structure carried on the base; and
at least one connecting structure for engaging the blade,
wherein the support structure is movably supported on the base so as to pivot or rotate relative thereto about a substantially horizontal axis in order to vary the orientation of the blade supported thereon, and
wherein the at least one connecting structure includes a bracket having a plurality of protruding legs, each protruding leg configured for engagement in the respective opening in the blade at one of the lifting points of the blade and configured for structural connection to the internal load bearing structure.

26. The assembly according to claim 25 wherein the openings in the surface of the blade are defined in shear tubes of the blade, the protruding legs of the at least one connecting structure being slidingly receivable in the shear tubes.

27. The assembly according to claim 26 wherein the shear tubes are structurally connected to the internal load bearing structure of the blade.

28. The assembly according to claim 25 wherein the openings in the surface of the blade and the protruding legs of the at least one connecting structure are similarly dimensioned.

* * * * *